No. 12,516. REISSUED JULY 31, 1906.

J. L. CURRAN.

FEED VALVE.

APPLICATION FILED JULY 6, 1906.

WITNESSES

J. S. Custer

J. B. MacDonald

INVENTOR

James L. Curran by E. A. Wright

Att'y.

UNITED STATES PATENT OFFICE.

JAMES L. CURRAN, OF SAN LUIS OBISPO, CALIFORNIA, ASSIGNOR TO THE WESTINGHOUSE AIR BRAKE COMPANY, OF PITTSBURG, PENNSYLVANIA, A CORPORATION OF PENNSYLVANIA.

FEED-VALVE.

No. 12,516. Specification of Reissued Letters Patent. Reissued July 31, 1906.

Original No. 763,162, dated June 21, 1904. Application for reissue filed July 6, 1906. Serial No. 325,041.

*To all whom it may concern:*

Be it known that I, JAMES L. CURRAN, a citizen of the United States, and a resident of San Luis Obispo, in the county of San Luis Obispo and State of California, have invented a new and Improved Feed-Valve, of which the following is a full, clear, and exact description.

This invention relates to the feed-valve employed in automatic air-brake systems in connection with the brake-valve to control the train-line pressure supplied from the main drum.

Heretofore in instances where the brake apparatus is arranged to operate with two train-line pressures it has been customary to provide two feed-valves set respectively to feed the two pressures and to arrange these valves so that either may be employed, according to the exigencies of the occasion.

The prime object of my invention is to provide a single feed-valve which may be made to serve the purposes of the plural valves now commonly employed. This end I attain by constructing the valve with means facilitating its ready adjustment from one pressure to another, so that the single valve may be made to feed high or low pressure, as the occasion may require.

This specification is an exact description of one example of my invention, while the claims define the actual scope thereof.

Reference is to be had to the accompanying drawings, forming a part of this specification, in which similar characters of reference indicate corresponding parts in both views.

Figure 1:
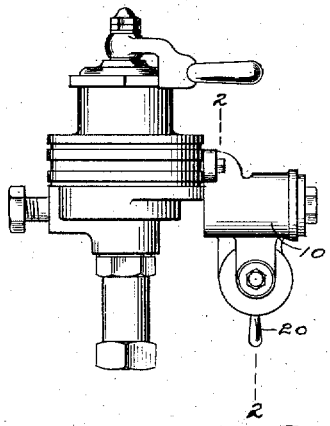
Figure 2:
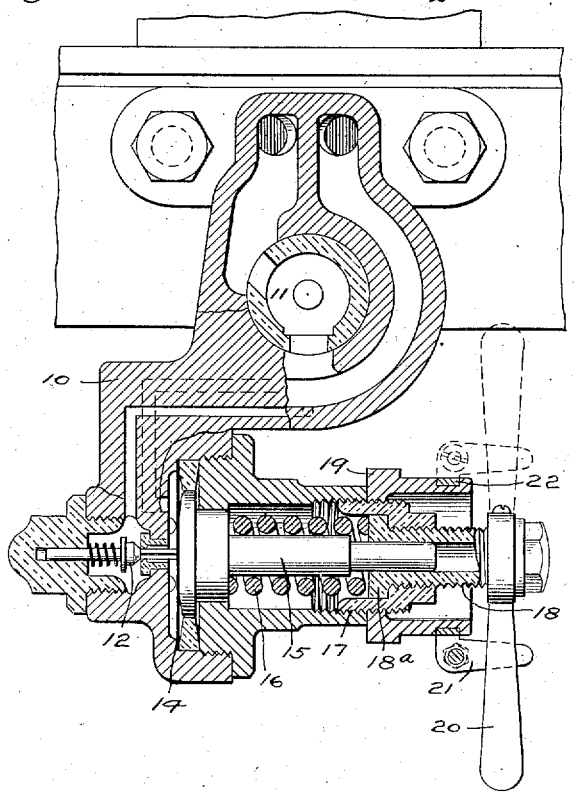

Figure 1 is an elevational view showing the feed-valve and brake-valve in their usual connection, and Fig. 2 is an enlarged sectional view taken substantially on the line 2 2 of Fig. 1.

The feed-valve may be of the usual type. As here illustrated it is the commercial Westinghouse slide feed-valve applied to the brake-valve in the usual manner.

10 indicates the valve-casing; 11, the slide-valve chamber; 12, the regulating-valve of the feed-valve; 14, the diaphragm for actuating the regulating-valve 12; 15, the diaphragm-stem; 16, the regulating-spring, and 17 the usual regulating-nut.

According to the form of my invention herein illustrated the regulating-nut 17 is formed with a central bore longitudinally threaded and a screw 18 operates therein, this screw having a flange 18[a], which bears against the regulating-spring in place of the regulating-nut 17. The said screw 18 is longitudinally recessed to receive the outer end of the stem 15, as shown.

19 indicates a lock-sleeve which is screwed on the regulating-nut and serves to hold the same firmly in the proper adjustment. Now it is clear that by moving the screw 18 outward in the nut 17 until the flange 18[a] engages said nut, as shown in Fig. 2, and then adjusting the nut and screw bodily the tension of the regulating-spring 16 may be set as desired. Then by tightening up the lock-sleeve 19 the regulating-nut may be held at this adjustment. It will be seen that the screw 18 may be moved inward from the position shown in Fig. 2. When the screw is moved outward, as in Fig. 2, the spring 16 is under a relatively low tension, and this sets the feed-valve to the low pressure. By moving the screw inward independently of the regulating-nut the regulating-spring may be set for high pressure.

Various means may be employed for thus adjusting the screw 18 independently of the nut 17. I have shown a handle 20, suitably fastened on the outer end of the screw, and a friction-band 22, which is mounted on the casing or lock-sleeve 19 and carries a projection 21, extending into the path of handle 20 and adapted to be engaged thereby when the handle is turned to the desired point to adjust the tension of the spring. This friction-band, with the projection, comprises an adjustable stop, which may be readily set in any position to which it is desired to turn the handle for adjusting the spring to one of the two desired pressures at which the system is to operate—as indicated, for instance, in dotted lines in Fig. 2. Then when it is desired to adjust the valve from one pressure to the other, as from the low pressure to the high pressure, it is only necessary to turn the handle 20 upward until it engages the stop or projection 21, as indicated in dotted lines, Fig. 2, thereby compressing the regulating-spring to the desired greater degree, and thus setting the valve device for the high pressure.

By means of this invention it will be seen that the engineer has only to throw the handle 20 from one position to another to change the adjustment of the feed-valve. This enables a single valve to serve the purpose of the duplex valve heretofore employed.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A feed-valve for brake systems, comprising the combination with the casing and valve, of an adjustable means for regulating the valve, a handle connected with the regulating means and lying outside of the casing, and a friction-band mounted on the valve-casing and having a projection for engaging the handle.

2. A feed-valve for brake systems, comprising the combination with the casing and valve, of an adjustable means for regulating the valve, a handle connected with the regulating means and lying outside of the casing, and an adjustable stop for the handle, and comprising a friction-band mounted on the valve-casing and a projection attached to the band.

3. A feed-valve for brake systems, comprising the combination with the casing, valve, and regulating-spring, of a screw for adjusting the regulating-spring, said screw extending outside of the valve-casing, a handle attached to the screw outside of the casing, and an adjustable stop for the handle, and comprising a friction-band having a projection mounted on the valve-casing.

4. A feed-valve for brake systems, comprising the combination with the casing, valve, regulating spring and nut, of an adjusting-screw operating in the nut and extending outside of the casing, a handle attached to the screw, a lock-sleeve operating on the regulating-nut, a friction-band on the lock-sleeve, and a projection on the friction-band for engaging the handle.

5. A feed-valve for brake systems, comprising the combination with the casing and valve, of an adjustable means for regulating the valve, a handle connected with the regulating means and lying outside of the casing, a member friction-tight on the valve-casing and carrying a projection for engaging the handle, for the purpose specified.

6. A feed-valve for brake systems, comprising the combination with the casing and valve, of a stem attached to the valve, a longitudinally-recessed screw loosely receiving the valve-stem, a regulating-spring bearing between the valve and screw, a regulating-nut threaded in the casing and having the screw threaded therein, and an operating-handle connected with the screw.

7. A feed-valve for brake systems, comprising the combination with the casing and valve, of a stem attached to the valve, a longitudinally-recessed screw loosely receiving the valve-stem, a regulating-spring bearing between the valve and screw, a regulating-nut threaded in the casing and having the screw threaded therein, an operating-handle connected with the screw, a lock-sleeve working on the regulating-nut and coacting with the casing, and a friction-band mounted on the lock-sleeve and having a projection engaging the handle, for the purpose specified.

In testimony whereof I have hereunto set my hand.

JAMES L. CURRAN.

Witnesses:
A. THALER,
H. N. SYNNUS.